United States Patent [19]

Humphrey

[11] Patent Number: 4,578,447

[45] Date of Patent: Mar. 25, 1986

[54] RIM NYLON-BASED URETHANE BLOCK POLYMER COMPOSITION

[75] Inventor: William M. Humphrey, Dover, N.H.

[73] Assignee: Ex-Cell-O Corporation, Troy, Mich.

[21] Appl. No.: 566,147

[22] Filed: Dec. 28, 1983

[51] Int. Cl.⁴ .................... C08G 65/32; C08G 18/77
[52] U.S. Cl. ............................ 528/73; 525/408; 525/424; 525/454; 528/52; 264/DIG. 83
[58] Field of Search ............... 528/73, 52; 525/408, 525/424, 454

[56] References Cited

U.S. PATENT DOCUMENTS

| | | | |
|---|---|---|---|
| 3,017,391 | 1/1962 | Mottus et al. | 260/78 |
| 3,017,392 | 1/1962 | Butler et al. | 260/78 |
| 3,086,962 | 4/1963 | Mottus et al. | 260/78 |
| 3,704,280 | 11/1972 | van der Loos et al. | 260/77.5 |
| 3,770,689 | 11/1973 | van der Loos et al. | 260/33.2 |
| 3,793,399 | 2/1974 | van der Loos et al. | 260/857 |
| 3,862,262 | 1/1975 | Hendrick et al. | 260/857 |
| 4,031,164 | 6/1977 | Hedrick et al. | 260/857 |
| 4,070,344 | 1/1978 | Hergenrother et al. | 260/77.5 |
| 4,151,222 | 4/1979 | Hergenrother et al. | 260/857 |
| 4,490,520 | 12/1984 | Ogasa et al. | 528/315 |

FOREIGN PATENT DOCUMENTS 21000  9/1981  Hungary .

OTHER PUBLICATIONS

Greenley, R. Z., J. C. Stauffer and J. E. Kurta, "The Kinetic Equation for the Initiated, Anionic Polymerization of e-Caprolactam", *Macromolecules*, vol. 2, No. 6, pp. 561–567, (Nov.–Dec. 1969).

Petit, D., R. Jerome and Ph. Teyssie, "Anionic Block Copolymerization of e-Caprolactam", *Journal of Polymer Science*, Polymer Chemsitry Edition, vol. 17, pp. 2903–2916, (1979).

Sebenda, Jan, "Lactam Polymerization", *J. Macromol. Sci–Chem*, A6(6), pp. 1145–1199, (1972).

Stehlicek, J. and J. Sebenda, "Block Copolymers of e-Captrolactam and Oxirane Prepared by the Activated Anionic Polymerization of e-Caprolactam, *Eur. Polym. J.*, vol. 18, pp. 535–540, (1982).

Van der Loos, J. L. M. and A. A. van Geenen, "Properties and Morphology of Impact Modified RIM Nylon", 186th National ACS Meeting, Washington, D.C. (Aug.-/Sep. 1983).

*Primary Examiner*—John C. Bleutge
*Assistant Examiner*—A. L. Carrillo
*Attorney, Agent, or Firm*—Lee A. Strimbeck

[57] ABSTRACT

A two part RIM nylon-based urethane block polymer consists of an anionic metal salt catalyst in minor proportions and a prepolymer consisting of the reaction product of a diisocyanate with a mixture of a polymeric triamine having primary amine groups and a polyether diol in a large excess of a ring lactam which serves as a reaction diluent. The prepolymer preparation process is characterized by the immediate formation of a visible high molecular weight polymer gel which redissolves with continued agitation. No free or extractable polymers, diols or isocyanate is observed in the polymer product.

11 Claims, No Drawings

RIM NYLON-BASED URETHANE BLOCK POLYMER COMPOSITION

This invention pertains to reaction injection molding (RIM) nylon-based urethane block polymer compositions useful for making automobile trim components such as fascia and even larger structures such as door panels. This molding composition is a two-part system consisting of an anionic lactam metal salt catalyst and a urethane prepolymer. The catalyst is preferably sodium caprolactam and the prepolymer is preferably the reaction product of methylene diisocyanate with a mixture of a lactam, a polymeric triamine supplying primary amino groups and a polyether diol supplying primary hydroxyl groups.

PRIOR ART

Searches have turned up many related patents and literature articles, the following of which are deemed representative and most pertinent.

| U.S. PATENTS | | |
|---|---|---|
| 3,017,391 | Mottus, et al | 1962 |
| 3,017,392 | Butler, et al | 1962 |
| 3,086,962 | Mottus, et al | 1963 |
| 3,704,280 | van der Loos, et al | 1972 |
| 3,770,689 | van der Loos, et al | 1973 |
| 3,793,399 | van der Loos, et al | 1974 |
| 3,862,262 | Hendrick, et al | 1975 |
| 4,031,164 | Hedrick, et al | 1977 |
| 4,070,344 | Hergenrother, et al | 1978 |
| 4,151,222 | Hergenrother, et al | 1979 |
| FOREIGN PATENTS | | |
| Hungarian Teljes (Abstract only) | 21000 | 9/28/81 |

OTHER PRIOR ART

Petit, D., R. Jerome and Ph. Teyssie, "Anionic Block Copolymerization of e-Caprolactam", *Journal of Polymer Science*, Polymer Chemistry Edition, Vol. 17, pp 2903–2916 (1979).

Van der Loos, J. L. M. and A. A. Van Geenen, "Properties of Impact Modified RIM Nylon", 186th National ACS Meeting, Washington, D.C., (August-/September 1983).

Stehlicek, J. and J. Sebenda, "Block Copolymers of e-Caprolactam and Oxirane Prepared by the Activated Anionic Polymerization of e-Caprolactam", *Eur. Polym. J.*, Vol. 18, pp 535–540 (1982).

Sebenda, Jan, "Lactam Polymerization", *J. Macromol. Sci-Chem*, A6(6), pp 1145–1199 (1972).

Greenley, R. Z., J. C. Stauffer and J. E. Kurta, "The Kinetic Equation for the Initiated, Anionic Polymerization of e-Caprolactam", *Macromolecules*, Vol. 2, No. 6, pp 561–567 (November–December 1969).

THIS INVENTION

In brief compass this invention is a two-part RIM nylon-based urethane block polymer composition comprising a small amount of an anionic catalyst comprising a monovalent metallic caprolactam salt, e.g. sodium caprolactam, and a prepolymer consisting essentially of the reaction product of a monomer mixture of a ring lactam, a polyoxy alkyl triamine, and a polyetherdiol with a diiosocyanate in a stoichiometric amount sufficient to give essentially complete reaction with the lactam, primary amine and hydroxy groups of the monomers. The lactam is present in considerable excess and serves as diluent for the prepolymer reaction. This is considered an important feature of the prepolymer preparation process.

Considering the high reactivity of the diol and amine monomers and the isocyanate, and of the catalyst, when these ingredients are brought together a single polymer is not formed but various combinations of copolymers and block polymers are produced which depending upon their proportions and physical interaction dictate the properties of the end product. What was considered surprising in the research work leading up to the development of this invention was not that these materials would react but that they would react to produce anything useful in view of what is taught in the above-cited literature. What was found was that there was an unexpected improvement in impact strength without unacceptable loss in flex modulus as compared to known nylon/urethane block copolymers. The Izod test values of the polymers exceed 300 and usually 700, while the flex modulus are above $50 \times 10^3$ psi, and usually above about $140 \times 10^3$ psi. In addition it was found that this new polymer absorbed water in what can be considered as only modest amounts, in view of the polymers high impact strength. The linear expansion after water absorption is usually less than 5%. These improved properties are at the same molecular weight level as the previously useful nylon/urethane polymers.

By the use of the four ingredients in the prepolymer, i.e. the lactam, the primary triamine, the diol and diisocyanate, it is possible by judicious control of portions and reaction conditions to tailor make these new block polymers to have desired properties. As one skilled in the art will appreciate, there is not a single copolymer or block polymer being produced but several different nylon/urethane block polymers are produced in "admixture", although this "admixture" is so integrated or physically bound together that the final molded composition contains no homo or copolymers that are extractable by the usual means. In the prepolymer itself, after reaction, there is essentially no observable free polyetherdiol or isocynate. An amount of the diisocyanate is used sufficient to give essentially complete reaction with the labile hydrogens of the hydroxy and amino groups.

While the above-cited literature suggests that others have thought that it may be beneficial to modify nylon-type polymers by incorporating an elastomeric imparting sequence in the chain to improve some properties, this usually has been at the sacrifice of other desired properties. No reference was found that suggested that the incorporation of the polyoxyalkylene triamine here used along with a polyether would be beneficial, i.e. would give a tighter more integrated or interlocked heterogeneous polymer structure that would have useful properties. That a tighter structure does result is indicated by the low water absorption of the present polymers, and the retention of an acceptable flex modulus.

The use of the polyoxyalkylene triamine is essential because of its very high reaction rate with the diisocyanate. This reaction produces a branched polymer of high molecular weight that is interspersed with the other polymers produced by other reactions. That a very high molecular weight polymer is produced is shown by the fact that a visually apparent gel is produced in the lactam diluent during the prepolymer preparation which gel redissolves with continued stirring. This gel generation and its redissolving seem characteristic of this prepolymer preparation process. Generally, the triamine/diisocyanate polymer is 12 to 20 weight percent of the polymer mass.

The following table gives the ranges in the proportions of ingredients that may be used to prepare this new nylon-based urethane block prepolymer.

| Monomer | Reactive Groups Per Mole | Mole Ratios Broad | Preferred | Example |
|---|---|---|---|---|
| Ring Lactam (1) | H O<br>N—C<br>R | 300 to 2000 | 600 to 1000 | 750 |
| Polyoxyalkyl Triamine (2) | —NH × 3 | 0.5 to 7.5 | 1 to 5 | 1 |
| Polyether Diol (3) | —OH × 2 | 0 to 5 | 1 to 3 | 1 |
| Diisocyanate | —NCO × 2 | 2 to 20 | 6 to 14 | 10 |

| Monomer | Reactive Groups Per Mole | Mole Ratios Broad | Preferred | Example |
|---|---|---|---|---|
| (4) | | | | |

The Preferred Monomers are:
(1) R is a 4 to 6 carbon atom chain.
(2) Polyoxypropylene triamine having molecular weight in range of 4000 to 7000. Preferably a mixture of two of the triamines is used, one of which has a lower molecular weight in the range of 1000 to 3000 and supplies at least 10% of the primary amine groups, while the higher molecular weight one supplies at least 60% of the primary amine groups. These amines are believed to have the structure:

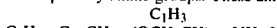

$C_2H_5$—C—$CH_2$—$(OCH_2CH)_x$—$NH_2$ 3
(3) Ethylene oxide capped polyether diol having a molecular weight in range of 1000 to 5000 and at least 80% primary hydroxyl groups.
(4) Aromatic diisocyanate with the isocyanate groups being attached to an aromatic nucleous.
In the range of 0.25 to 5 mole percent of the sodium caprolactam catalyst will usually be used with the prepolymer to make the polymer.
Interesting block polymers can be made without the use of the polyether diol. These polymers tend to be softer and to have slightly poorer heat resistance.

The prepolymer is prepared by mixing the three monomers and reducing the water content as necessary to essentially bone dry conditions and then adding the isocyanate under an inert gas blanket at an initial reaction temperature in the range of 20° to 50° C.

EXAMPLES

The following table gives several examples of the invention and identifies with particularity the materials used. These examples are on a weight percent basis but the mole amounts are stated for Example V.

| EXAMPLE (1) | I | II | III | IV | V | MOLE RATIOS OF REACTANTS FOR EXAMPLE V |
|---|---|---|---|---|---|---|
| Catalyst (2) | | | | | | |
| eCL | 43.078 | 43.078 | 43.078 | 43.078 | 39.652 | 355.55 |
| NaH (6) | 0.922 | 0.922 | 0.922 | 0.922 | 0.848 | 21.44 |
| Prepolymer: | | | | | | |
| eCL | 43.077 | 43.077 | 43.077 | 43.077 | 39.667 | 355.68 |
| Triamine-1 (3) | 9.054 | 9.054 | 0 | 0 | 12.860 | 2.51 |
| Triamine-2 | 0 | 0 | 9.684 | 0 | 0 | |
| Triamine-3 | 0 | 0 | 0 | 8.297 | 0 | |
| Polyether diol (4) | 2.828 | 2.828 | 2.368 | 3.382 | 4.017 | 1 |
| MDI (5) | 1.041 | 1.041 | 0.871 | 1.244 | 2.956 | 12 |
| Polymer Properties: | | | | | | |
| Cure time @ 150° C., min | 15 | 15 | 15 | 15 | 5 | |
| Specific Gravity | 1.13 | 1.13 | 1.12 | 1.13 | 1.11 | |
| Flex Mod, RT, PSI × 10 (ASTM-D790) | 181 | 134.8 | 49.8 | 184 | 76.4 | |
| Sag, 1 hr @ 204° C., mm | 4.3 | 5.8 | 20 | 7.9 | 30.5 | |
| Sag, 1 hr @ 114° C., mm | 0 | 2.3 | 0.7 | 0 | 3.6 | |
| Izod, J/M (ASTM-2569) | 362 | 803 | 702 | 295 | 1055 | |
| Linear Expansion After 240 hours Water Immersion @ 23° C., % | 3.6 | — | 4.05 | 4.44 | 3.47 | |

| EXAMPLE (1) | I | II | III | IV | V | MOLE RATIOS OF REACTANTS FOR EXAMPLE V |
|---|---|---|---|---|---|---|
| (ASTM-D570) | | | | | | |

Notes:
(1) Parts are by weight active ingredient.
(2) The sodium hydride was supplied as a 50% dispersion in oil.
(3) The triamines were Jeffamine's ® polyoxypropylenes from Texaco Chemical Company, 4800 Fournall Place, Bellaire, Texas 77401.
Triamine-1 was Jeffamine T-5000 of 5200 molecular weight
Triamine-2 was Jeffamine T-4300 of 4300 molecular weight
Triamine-3 was Jeffamine T-6500 of 6500 molecular weight
These triamines are liquid at the reaction temperatures.
(4) The polyether diol was Poly-G ® 55-28 supplied by Olin Chemicals, 120 Long Ridge Road, Stamford, Connecticut 06904. This is an ethylene oxide end capped polyether diol having a primary hydroxyl content of 80-90%, a hydroxyl number of 28, and a theoretical molecular weight of 4,000.
(5) The diisocyanate was methylene bis diisocyanate, Isonate ® 125 M, from Upjohn Polymer Chemicals, Box 685, La Porte, Texas 77571.
(6) The e-caprolactam (eCL) was supplied by Nipro Incorporated, P.O. Box 1483, Augusta, Georgia 30903. It was 99.8 + weight percent pure.

The catalyst was a three mole percent sodium caprolactam prepared by reacting the 50% oil dispersion of sodium hydride with the caprolactam which had been dried at least one-half hour at 90° C. or better under 5 mm HG vacuum to less than 50 ppm moisture content. It was thereafter maintained under positive nitrogen gas flow to prevent moisture uptake by the caprolactam.

The caprolactam terminated urethane prepolymer was prepared using an "in situ" technique. The three monomers were mixed and dried in a reaction vessel at 121° C. under 5 mm HG vacuum to less than 50 ppm moisture content. Atmospheric pressure was restored with nitrogen gas and continuous flow of that gas was maintained. Molten MDI at 43° C. was added to the reaction vessel with agitation. Reaction conditions were maintained at least ½ hour after which a sample was removed for analysis. When the MDI was added a visible gel would immediately form which would then redissolve with the continued agitation. This was possible because of the excess of lactam present. As is known in the art, some urethane block prepolymers like this form insoluble gels that cannot be further processed but in the present invention these gels will go back into solution which permits further processing.

The catalyst and caprolactam terminated urethane prepolymer were reacted in the excess caprolactam associated with the catalyst portion using the caprolactam as the reaction medium and diluent. Samples were prepared for physical property evaluation by weighing the approximately stochiometric amounts of the catalyst and the prepolymer into a beaker, heated to 150° C., stirring for 15 to 30 seconds, and pouring the mixture into a heated steel or aluminum mold maintained at 150° C. to form a test panel or plaque. The polymerizing mixture is initially very liquid and pours well. The panel thickness is 0.120 inches. The physical properties given in the table were obtained from these panels.

These data show that the polymer has an improved impact strength as compared to other types of nylon-based polymers that have added flex imparting ingredients such as a rubber. This improvement is believed to be caused by the presence of a high molecular weight fraction in the prepolymers which was observed by means of gel permeation chromatography (PGC). No unreactive polyol or isocyanate was observed during this chromatographic analysis. Further evidence of a high molecular weight fraction was found by increasing the isocyanate levels. As the amount of isocyanate increases, less cross linked structure occurs and the amount of high molecular weight fraction decreases.

It is believed that the high molecular weight fraction is the result of the difference in the isocyanate reaction rate with the primary amines which are much faster reacting with the isocyanates than primary hydroxl groups or the cyclic amides, i.e. upon adding isocyanate, the isocyanate/amine reaction is highly favored over the isocyanate/hydroxyl reaction which is in turn favored over the isocyanate/lactam reaction. With this sequence and the resulting solubility of the urethane block polymer gel in the prepolymer lactam, it is possible to build structures of varying desired properties—the unique composition of this invention offers a great deal of flexibility to tailor-make polymers for specific commercial applications.

I claim:

1. A nylon-based urethane block prepolymer suitable for reaction injection molding when reacted with an anionic catalyst comprising a monovalent metal caprolactam salt, said prepolymer comprising the reaction mixture of:

|  | Mole Ratios |
|---|---|
| Ring Lactam | 600 to 1000 |
| Polyoxyalkyl triamine | 1 to 5 |
| Polyether diol | 1 to 3 |
| Diisocyanate | 6 to 14 | said isocyanate being added to the liquid admixture of the other three components.

2. The prepolymer of claim 1 wherein said ring lactam has in the range of 4 to 6 carbon atoms in the ring; said polyoxyalkyl triamine is a polyoxypropyleneamine having a molecular weight in the range of 4000 to 7000; said polyetherdiol has a molecular weight in the range of 1000 to 5000 and is ethylene oxide end capped to have a primary hydroxyl content of at least 80%, and said diisocyanate is an aromatic with the isocyanate groups being attached to an aromatic nucleus.

3. The prepolymer of claim 2 wherein in addition to said polyoxyalkyl triamine there is a second polyoxyalkyl triamine present having a molecular weight in the range of 1000 to 3000 and supplying in the range of 10 to 40% of the primary amino reactive groups, and wherein said diisocyanate is methylene bis diisocyanate.

4. The prepolymer of claim 2 wherein the admixture of the three components is first dried under vacuum at an elevated temperature followed by blanketing with inert gas at ambient pressure and thereafter the diisocyanate is added at an initial reaction temperature in the range of 20° to 50° C., said prepolymer at the end of the reaction having essentially no free polyol and isocyanate.

5. The prepolymer of claim 4 wherein the reaction is charcterized by the formation of a visible gel in the ring lactam followed by resolution of said gel with continued agitation.

6. A molded composition comprising the reaction product of the prepolymer of claim 2 within the range of 0.25 to 5 mole percent of a monovalent metal caprolactam salt in a heated mold, said molded composition having an Izod test value exceeding 300; a linear expansion after water immersion of less than 5%, and a room temperature flex modulus of at least $50 \times 10^3$ psi.

7. The molded composition of claim 6 being essentially free of extractable polymers.

8. A two part, RIM nylon-based urethane block polymer composition, comprising in approximately stoichiometric proportions a catalyst consisting essentially of sodium caprolactam and a prepolymer consisting essentially of the reaction product of:

|  | Mole Ratios |
| --- | --- |
| e-caprolactam | 600 to 1000 |
| Polyoxypropylenetriamine | 1 to 5 |
| Polyether diol - >80% primary - OH | 1 to 3 |
| Methylene diisocyanate | 6 to 14 | said polyoxypropylene triamine being liquid and having a molecular weight in excess of 4000, and said polyether diol having a molecular weight in the range of 1000 to 5000 at least 80% of the hydroxyl groups thereof being primary hydroxyl groups;

said methylene diisocyanate being added with agitation to the essentially water free liquid mixture of the other ingredients with a visible gel being formed which redissolves with continued agitation; and said catalyst and prepolymer when admixed in a mold curing to a molded article.

9. A nylon-based urethane block prepolymer comprising the reaction product of an aromatic diisocyanate with a liquid mixture of a polyoxypropylene triamine and a polyether diol in a large excess of a ring lactam, an approximate stoichiometric amount of the diisocyanate being used to react with the triamine and diol with essentially no free isocyanate remaining and the reaction being characterized by the production of a visible high molecular weight polymer gel which redissolves with continued agitation of the reaction mixture.

10. A polymer product consisting of the reaction product of the prepolymer of claim 9 with a minor amount of a monovalent metal salt of said ring lactam.

11. The polymer product of claim 9 wherein said ring lactam is e-caprolactam, said monovalent metal salt is sodium caprolactam, said diisocyanate is MDI, said polyoxyalkyl triamine is a polyoxypropylene triamine and said polyether diol is an ethylene oxide capped polyether diol having at least 80% primary hydroxyl groups.

* * * * *